United States Patent [19]

Maruyama et al.

[11] Patent Number: 5,272,843
[45] Date of Patent: Dec. 28, 1993

[54] METHOD AND APPARATUS FOR TRUING A GRINDING WHEEL

[75] Inventors: Toshio Maruyama, Gifu; Tadashi Yamauchi, Kariya; Shoichi Sano, Gamagori, all of Japan

[73] Assignee: Toyoda Koki Kabushiki Kaisha, Kariya, Japan

[21] Appl. No.: 678

[22] Filed: Jan. 5, 1993

[30] Foreign Application Priority Data

Jan. 16, 1992 [JP] Japan .................. 4-005861

[51] Int. Cl.$^5$ .............................. B24B 53/00
[52] U.S. Cl. .................. 51/165.87; 51/325; 125/11.06; 125/11.13
[58] Field of Search .................. 51/165.87, 325; 125/11.02, 11.06, 11.13, 11.01

[56] References Cited

U.S. PATENT DOCUMENTS

| 4,502,125 | 2/1985 | Yoneda et al. | 51/165.87 |
| 4,899,718 | 2/1990 | Usutani et al. | 51/165.77 |
| 5,183,026 | 2/1993 | Ohta et al. | 51/165.87 |

*Primary Examiner*—Robert A. Rose
*Attorney, Agent, or Firm*—Oblon, Spivak, McClelland, Maier & Neustadt

[57] ABSTRACT

A method for truing a grinding wheel having a non-straight cylindrical grinding surface. In truing operation, a truing tool is caused to contact different portions of the grinding surface, and relative position of the truing tool is detected when the truing tool contacts the respective portions. Then, a first portion rom which a largest amount of abrasive layer must be removed, and a second portion from which a smallest amount of abrasive layer must be removed are found out. Based upon the detected positions, the radial location of an initial truing start position and a truing operation end position are calculated. The truing tool is initially moved to the initial truing start position, and then traversed from the truing start position along a locus corresponding to a desired final shape of the grinding wheel. The radial location of the truing start position is then shifted in a direction of approaching to the rotational axis of the grinding wheel, and the traverse movement is repeated. When the radial location of the truing start position reaches or exceeds the truing operation end position, the truing operation is stopped.

5 Claims, 12 Drawing Sheets

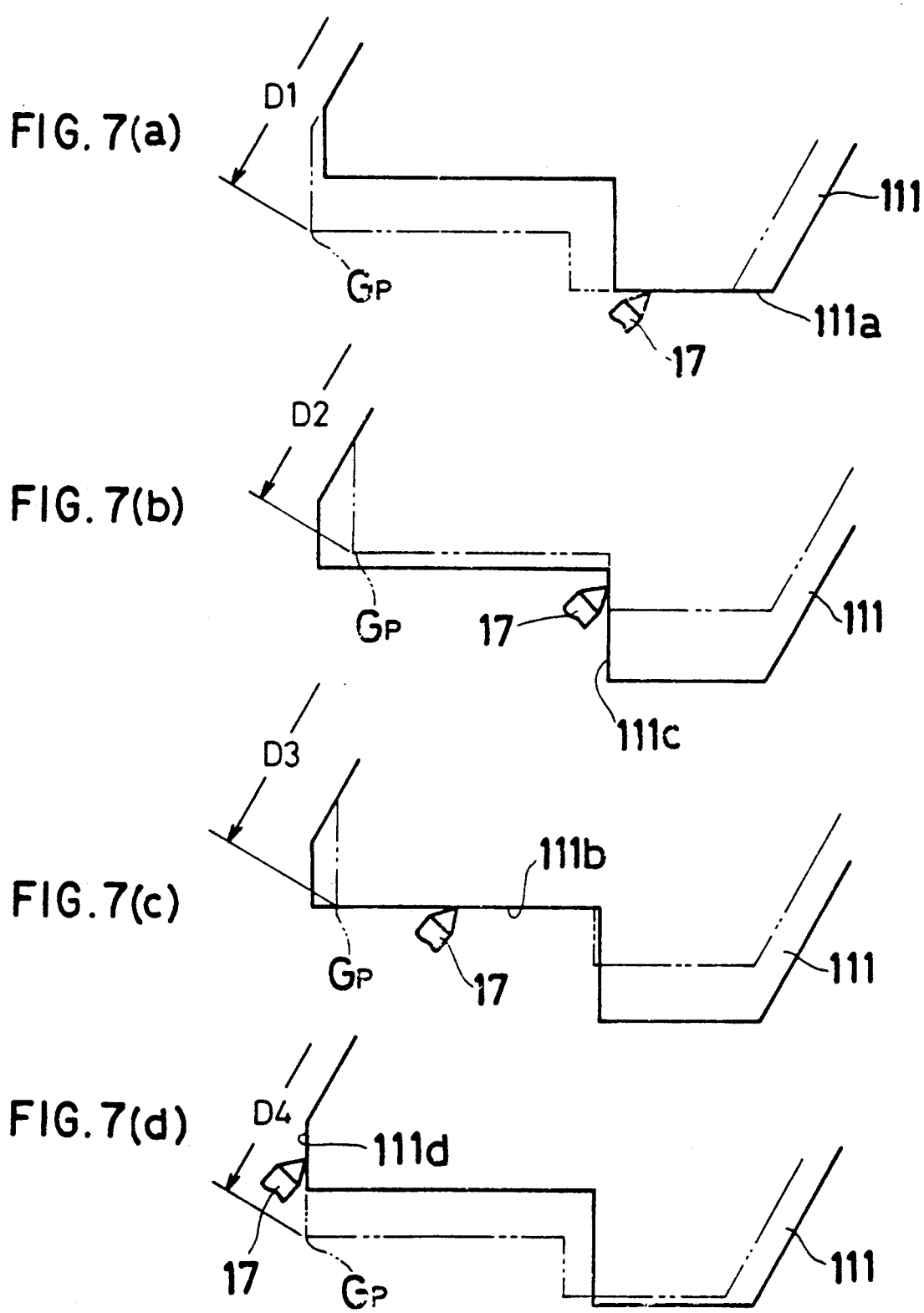

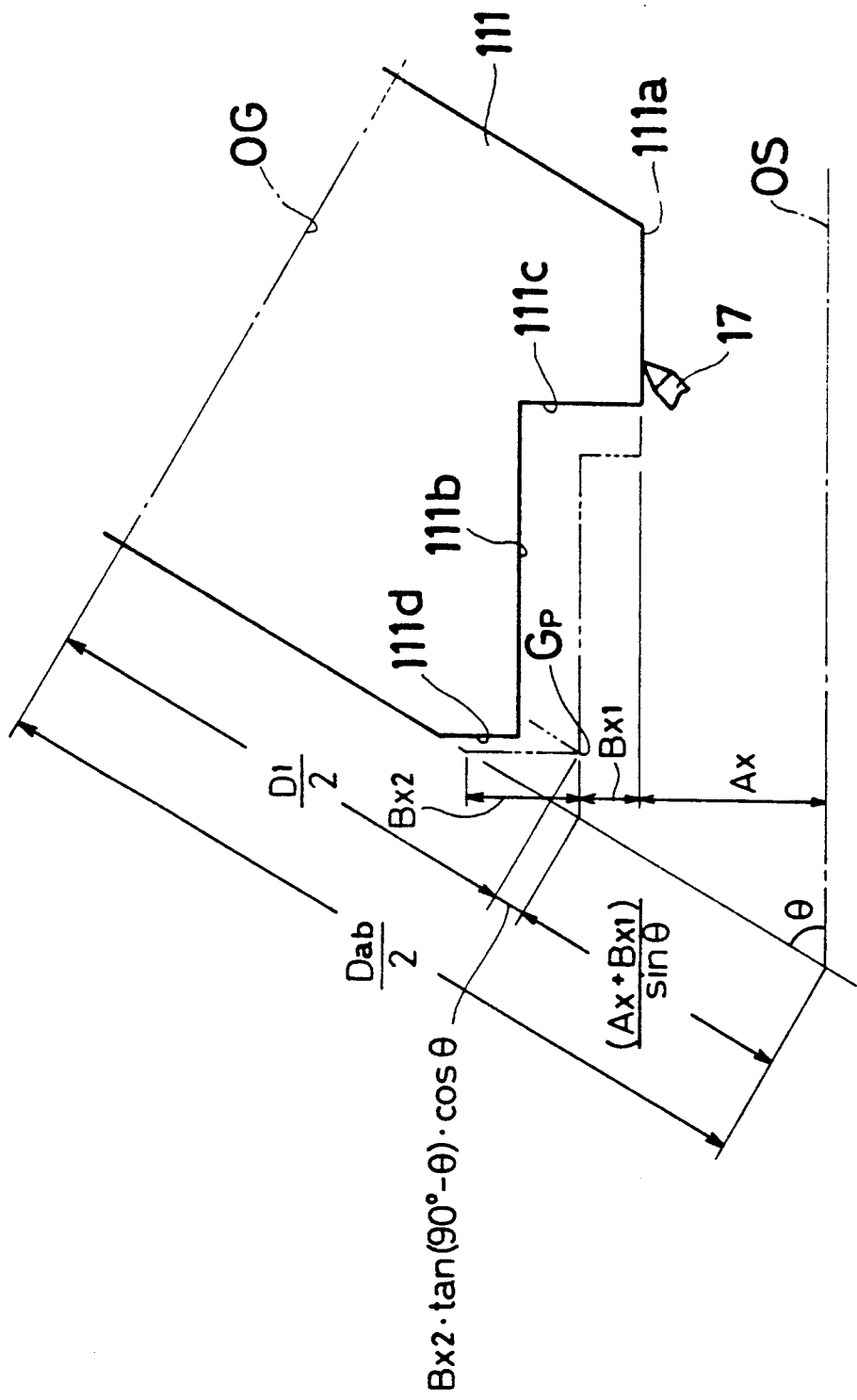

METHOD AND APPARATUS FOR TRUING A GRINDING WHEEL

BACKGROUND OF THE INVENTION

1. Field of the Invention

This invention relates to a method and an apparatus for truing a grinding wheel, and more particularly, to a method and an apparatus for truing a grinding wheel having a non-straight cylindrical grinding surface.

2. Prior Art of the Invention

In a numerical controlled grinding machine, a grinding wheel having a stepped peripheral shape is used for grinding a workpiece having a stepped outer surface, namely, a workpiece having plural cylindrical outer surfaces and plural shoulder end surfaces adjacent to the respective cylindrical outer surfaces. Although such grinding wheel is manufactured to have a desired stepped peripheral shape, the grinding wheel has an initial shape slightly different from the desired shape because of inaccuracy of the manufacturing process. Further, there is a case where a user wants to slightly change the peripheral shape of the grinding wheel before using the grinding wheel.

Accordingly, it is necessary to true the grinding wheels before using them, so that the grinding wheels have desired peripheral shapes.

An apparatus which can be used for the above-mentioned truing operation is disclosed in the U.S. Pat. No. 4,899,718 which was assigned to the assignee of this application. The apparatus is provided with a contact detection sensor such as an AE (acoustic emission) sensor for outputting a contact signal when a truing tool contacts a grinding wheel. In dressing operation, the truing tool is moved relative to the grinding wheel so that the truing tool contacts each of the two inclined surface portions of the grinding wheel, and then the position of the truing tool is detected when the truing tool contact the respective surface portions. Based on these positions thus detected, it is judged which surface portion has a larger removal amount to be removed by truing operation, compared to the other. An initial truing start position of the truing tool is determined based on the radial position of the surface portion which has a larger removal amount, and the truing tool is then traversed along the outer surface of the grinding wheel while following a template. Ascertainment is made as to whether the contact sensor outputs a contact signal continuously during the traverse fed. If the continuous issue of the contact signal is not ascertained, then the truing tool is infed a predetermined amount against the grinding wheel before it is traversed. The infeed and the traverse feed of the truing tool are repeated until the continuous issuance of the contact signal during each traverse feed movement is finally ascertained.

The above-mentioned truing apparatus has a disadvantage that the mechanical structure thereof is complex, because it needs a template and a stylus, and that the template must be changed when the grinding wheel is trued in different shapes.

Further, in the conventional apparatus, it is required that the AE sensor outputs the contact signal continuously during the time period when the truing tool contacts the grinding wheel. However, it is difficult to obtain a stable contact signal from the AE sensor, because the AE sensor detects a sound wave which is generated when the truing tool contacts the grinding wheel. The level of the sound wave changes depending on the shape of a surface portion which the truing tool contacts, namely, depending on whether the surface portion has a straight shape or a curved shape. Further, the level of the sound wave changes depending on the amount of coolant supplied to the outer surface of the grinding wheel during truing operation. Therefore, it is difficult to judge whether or not the truing tool continuously contacts the grinding wheel, even though the detection sensitivity of the AE sensor is adjusted. This causes inaccuracy of truing operation.

SUMMARY OF THE INVENTION

Accordingly, it is an object of the present invention to provide improved method and apparatus for stably and optimally truing a grinding wheel having a non-straight cylindrical grinding surface.

Another object of the present invention is to provide improved method and apparatus for truing a grinding wheel having a non-straight cylindrical grinding surface, without utilizing any template, thereby simplifying the mechanical structure of the truing apparatus.

Briefly, the present invention provides a method and an apparatus for truing a grinding wheel having a non-straight cylindrical grinding surface. Initially, a relative movement is effected so that the truing tool contacts different portions of the grinding surface, and the relative position of the truing tool is detected when the truing tool contacts the respective portions of the grinding surface. After that, a first portion from which a larger amount of abrasive layer must be removed compared to the rest of the grinding surface, and a second portion from which a smaller amount of abrasive layer must be removed compared to the rest of said grinding surface are found out. Based on the detected radial positions, an initial truing start position and a truing operation end position are calculated. After positioning of the truing tool to the initial truing start position, traverse movement of the truing tool is repeated while the radial position of the truing start position is gradually changed in a direction of approaching to the rotational axis of the grinding wheel. When the radial position of the truing start position reaches or exceeds the truing operation end position, the truing operation is stopped.

According to the present invention, the initial truing start position is determined based on the radial position of a first portion of the grinding surface from which a larger amount of abrasive layer must be removed as compared to the rest of the grinding surface, and a truing operation end position is determined based on a radial position of a second portion of the grinding surface from which a smaller amount of abrasive layer must be removed compared to the rest of the grinding surface. Therefore, it is possible to properly true all portions of the grinding surface within a shortest time. Further, since the timing of stopping the truing operation can be determined accurately without instability, the truing operation can be controlled accurately. This ensures that optimum truing operation is properly carried out.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIGS. 1 (a) and 1 (b) are explanatory charts showing grinding wheels having different shapes;

FIGS. 2 (a), 2 (b) and 2 (c) are explanatory charts showing a method of determining an initial truing start position and a truing operation end position;

Figure 3:
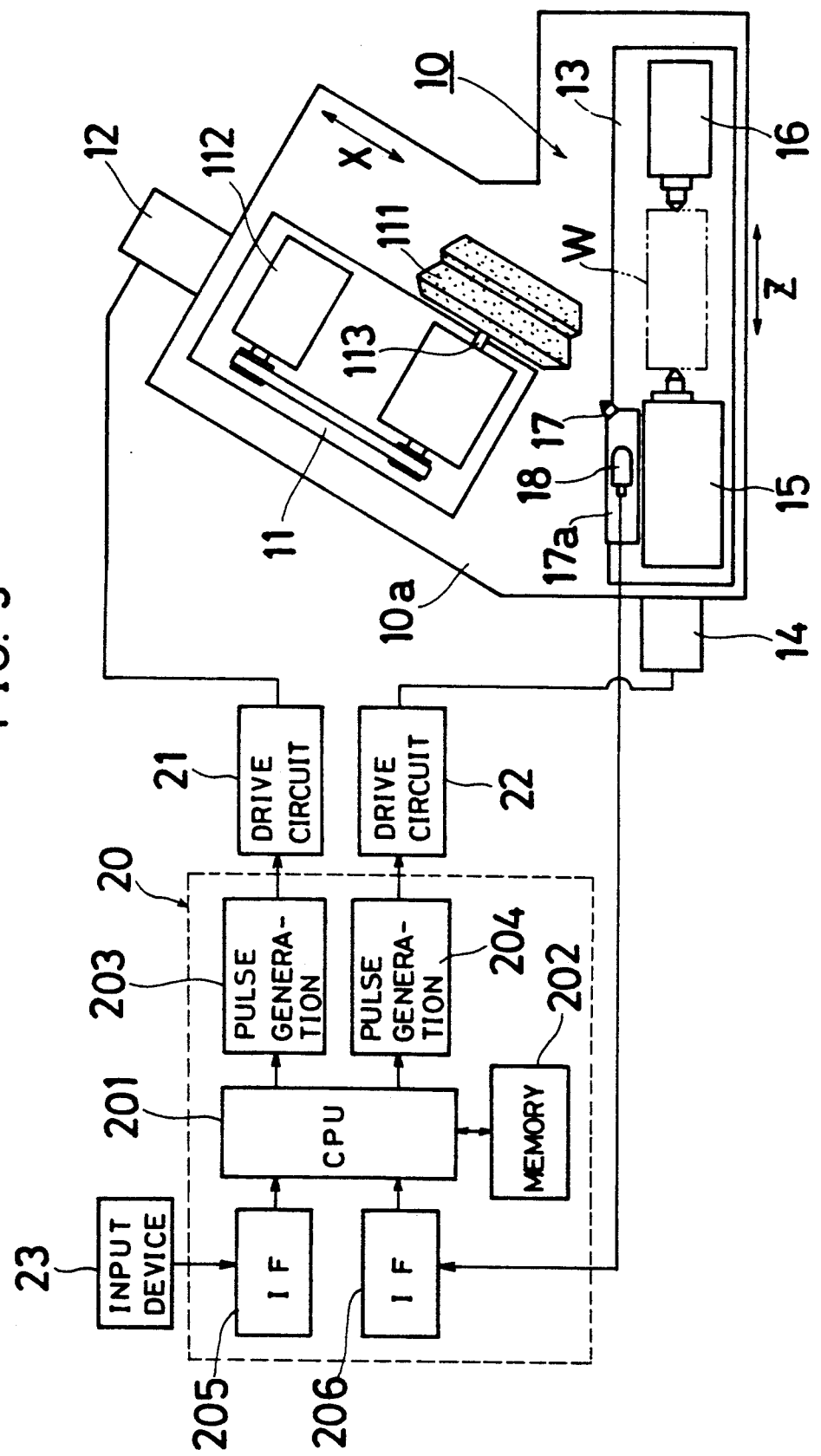
FIG. 3 is a plan view of a grinding machine according to an embodiment of the present invention.
Figure 5A:
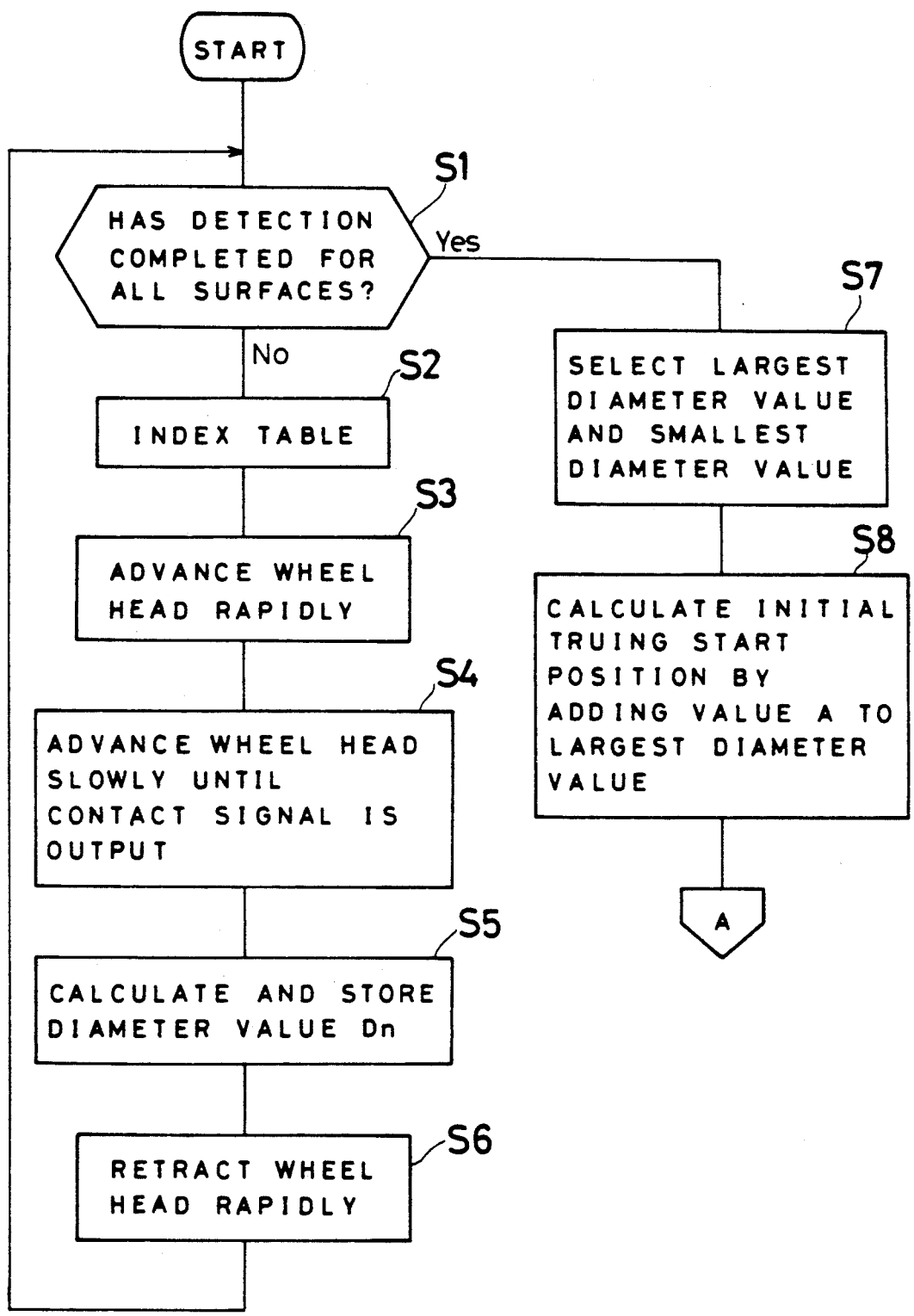
Figure 5B:
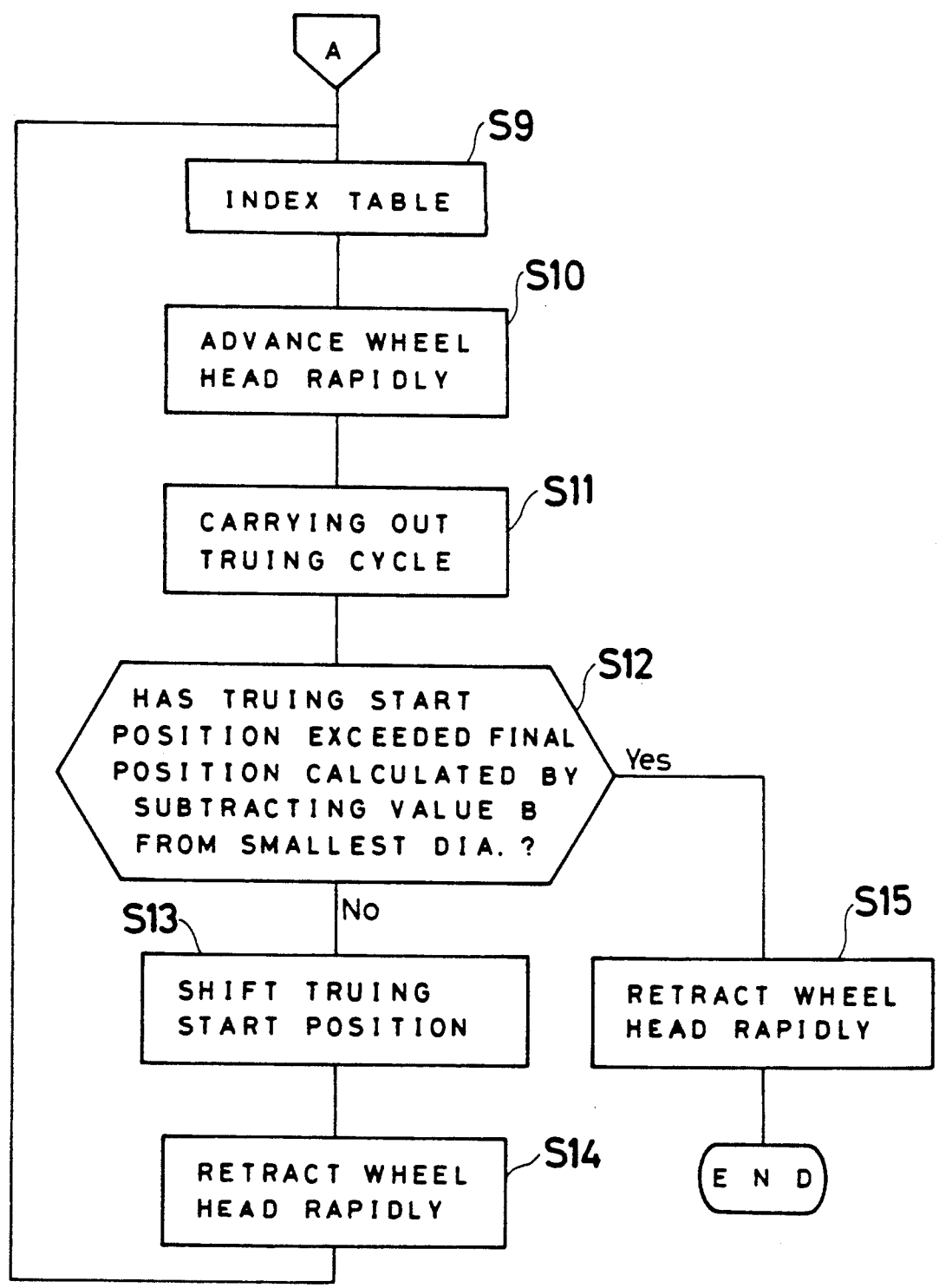
Figure 6:
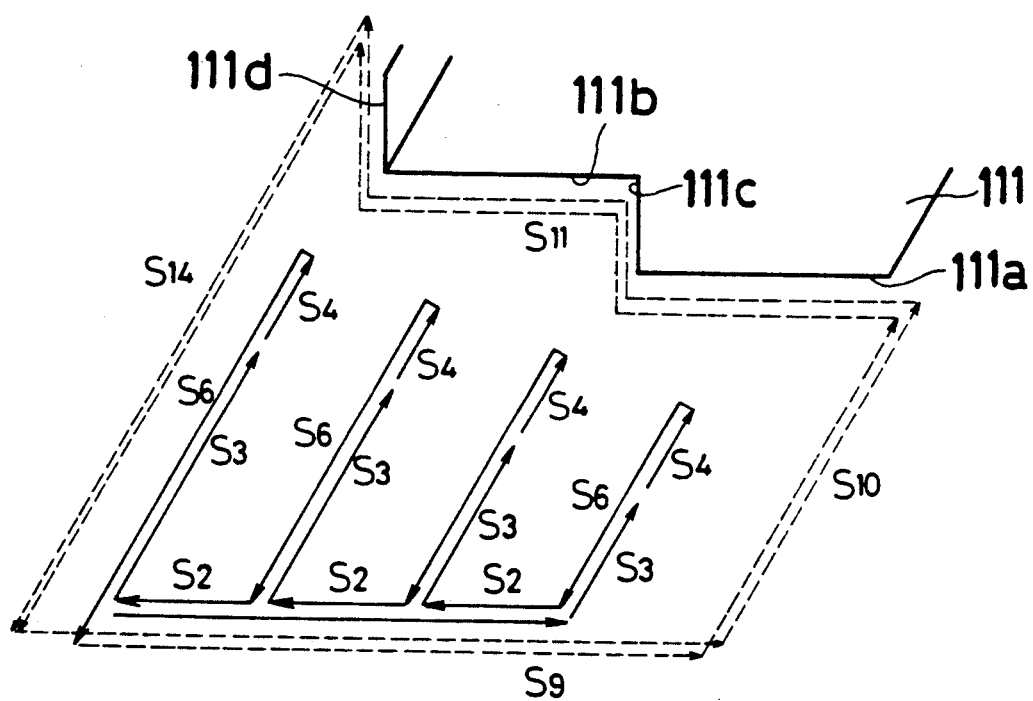
Figure 9A:
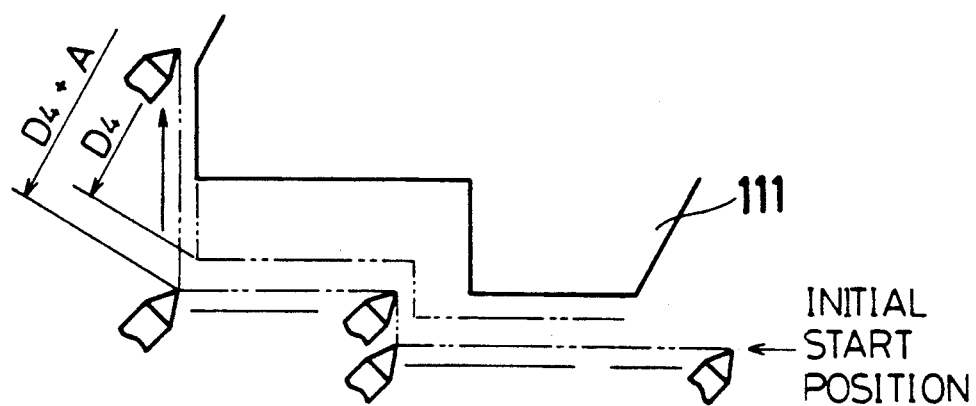
Figure 9B:
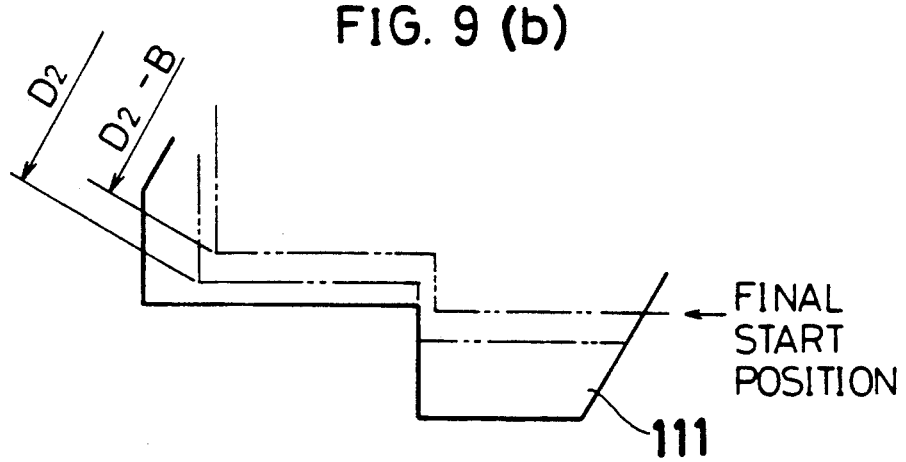
Figure 10A:
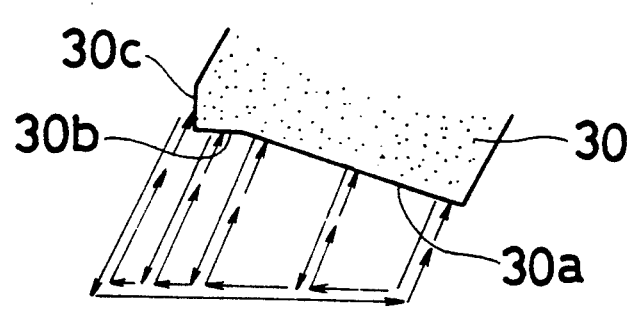
Figure 10B:
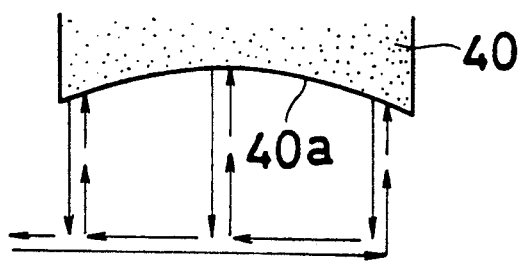

FIGS. 5 (a) and 5 (b) are flowcharts showing an operation of the numerical controller shown in FIG. 3;

FIG. 6 is an explanatory chart showing a moving locus of the truing tool for detecting the positions of plural portions of the grinding surface of the grinding wheel, and a moving locus of the truing tool for truing the grinding surface;

FIGS. 7 (a) through 7 (d) are explanatory charts showing the positional relationships between the grinding wheel and the truing tool when the radial position of the grinding surface is detected at different portions;

FIG. 8 is an explanatory chart showing a manner for mathematically obtaining an imaginal diameter for a first cylindrical surface portion of the grinding surface;

FIGS. 9 (a) and 9 (b) are explanatory charts showing an initial truing start position and a truing operation end position; and FIGS. 10 (a) and 10 (b) are chart showing different kinds of grinding wheel having different shapes.

DETAILED DESCRIPTION OF PREFERRED EMBODIMENT

Theory of the Invention

Initially, the theory of the present invention will be described using simple examples. A cylindrical grinding wheel shown in FIG. 1 (a) has a first surface portion 1a and a second surface portion 1b to be trued. The broken line Lf indicates a desired final shape, and a truing tool 2 is traversed along a locus Lt, which corresponds to the desired final shape Lf. In this example, a removal amount Ta of the first surface portion 1a, which must be removed during truing operation, is larger than that of the second surface portion 1b. In such case, the radial location of an initial truing start position is determined based on the first surface portion 1a. Further, the radial location of a truing operation end position is determined based on the second surface portion 1b so as to remove a required amount of abrasive layer from the second surface portion 1b.

Figure 1A:
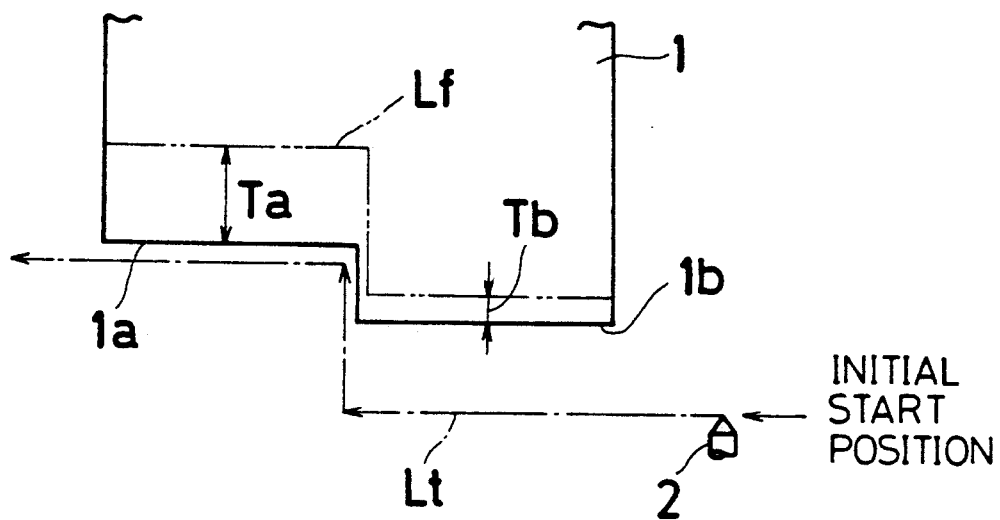
Figure 1B:
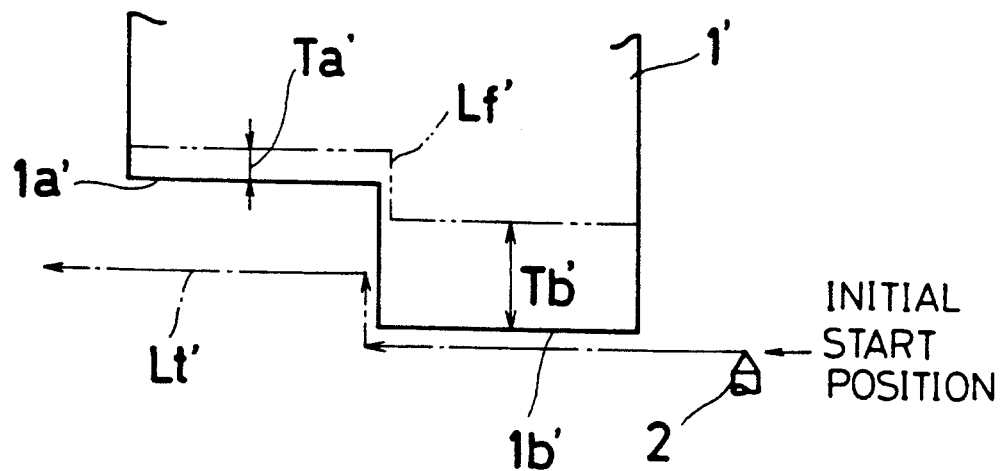

FIG. 1 (b) shows another example in which the removal amount Tb' of the second surface portion 1b' is larger than the removal amount Ta' of the first surface portion 1a'. This is reverse as compared to the example shown in FIG. 1 (a). In such case, the radial location of the initial truing start position is determined based on the second surface portion 1b, while the radial location of the truing operation end position is determined based on the first surface portion 1a.

As is understood from the above explanation, the radial location of the initial truing start position is determined based on the radial position of a surface portion from which a larger amount of abrasive layer is removed, and the radial location of the truing operation end position is determined based on the radial position of a surface portion from which a smaller amount of abrasive layer is removed.

Figure 2A:
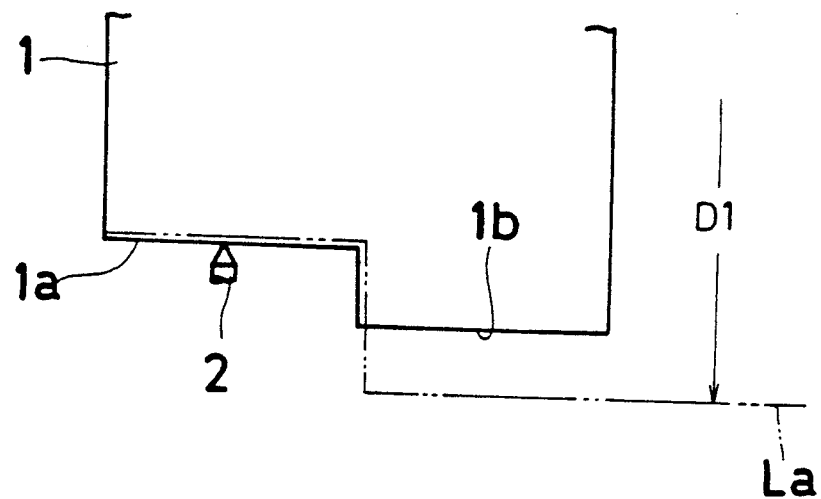
Figure 2B:
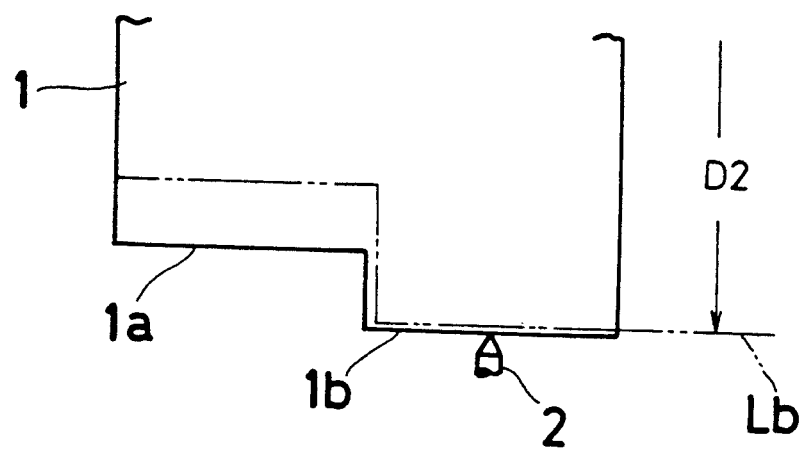
Figure 2C:
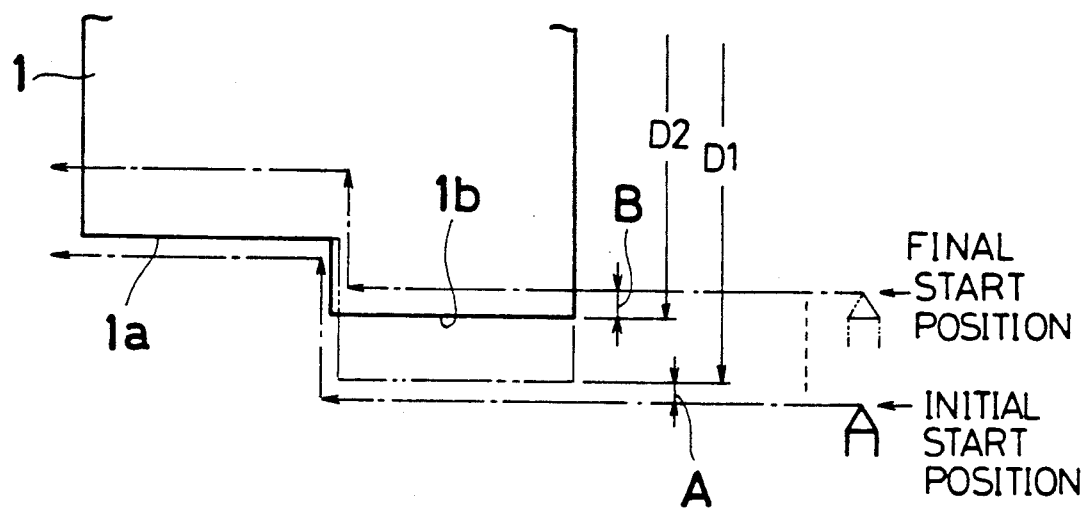

FIGS. 2 (a) and 2 (b) illustrate a method for finding out a surface portion from which a larger amount of abrasive layer is removed. In this method, a contact sensor is used which detects contact between the grinding wheel and the truing tool. Relative movement is effected between the grinding wheel and the truing tool so that the truing tool 2 contacts the surface portions 1a and 1b, respectively. When the truing tool 2 contacts the first surface portion 1a, a locus La is considered which corresponds to a desired final shape Lf and which coincides with the initial shape of the grinding wheel 1 at the first surface portion 1a, as shown in FIG. 2 (a). Then an imaginal diameter D1 of the locus La is calculated based upon the radial position of the first surface portion 1a. When the truing tool 2 contacts the second surface portion 1b, a locus Lb is similarly considered which coincides with the initial shape of the grinding wheel 1 at the second surface portion 1b, as shown in FIG. 2 (b). Then an imaginal diameter D2 of the locus Lb is calculated based upon the radial position of the second surface portion 1b. Between these imaginal diameters D1 and D2, the larger imaginal diameter D1 is used to determine the initial truing start position, and the smaller imaginal diameter D2 is used to determine the truing operation end position. Namely, the initial truing start position is calculated by adding a predetermined amount to the imaginal diameter D1, and the truing operation end position is calculated by subtracting a predetermined amount from the imaginal diameter D2.

Although a grinding wheel having only two surface portions is used in the above-explanation, the present invention can be used for truing a grinding wheel having three or more surface portions, as will be explained hereinafter. In such case, the initial truing start position is determined based upon the radial position of a surface portion which has a largest removal amount to be removed by truing operation, and the truing operation end position is determined based upon the radial position of another surface portion which has a smallest removal amount to be removed by truing operation.

First Embodiment

A preferred embodiment, which uses the above-mentioned method, will be now described with reference to drawings.

In FIG. 3, numeral 10 represents a grinding machine and numeral 20 represents a numerical controller. The grinding machine 10 has a bed 10a on which a wheel head 11 and a workpiece table 13 are supported for movements in X-axis direction and Z-axis direction which intersect with each other. The wheel head 11 is moved in X-axis direction by a servomotor 12 through a not-shown feed mechanism including a ball screw and a nut. The workpiece table 13 is moved in Z-axis direction by a servomotor 14 through a not-shown feed mechanism including a ball screw and a nut.

Figure 4:
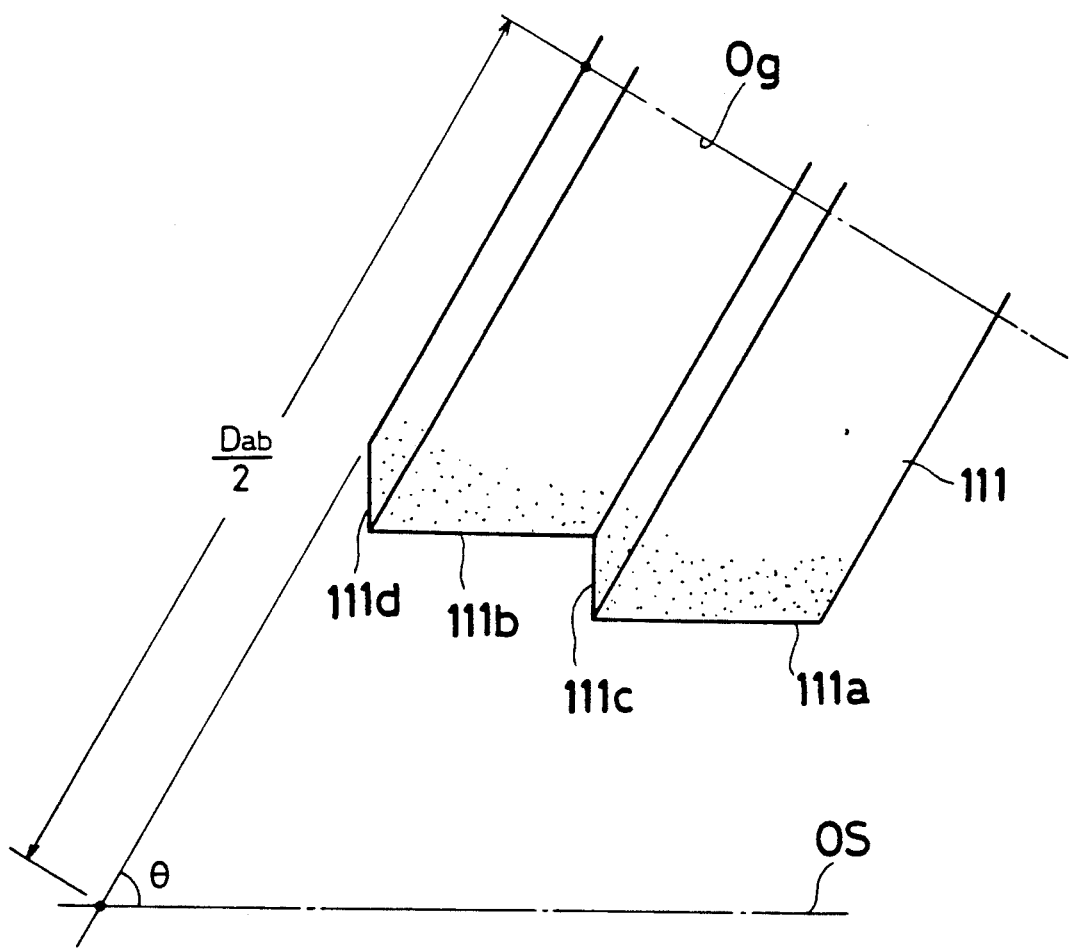
FIG. 4 is a chart illustrating the shape of the grinding wheel shown in FIG. 3.

A grinding wheel 111 is carried by the wheel head 11 through a wheel spindle 113, and the grinding wheel 11 is rotated through the wheel spindle 113 by a drive motor 112 mounted on the wheel head 11. The grinding wheel 11 has a stepped peripheral shape, as shown in FIG. 4. Namely, the grinding wheel has a pair of cylindrical surface portions 111a and 111b, and a pair of end surface portions 111c and 111d.

A spindle head 15 and a tail stock 16 are mounted on the workpiece table 13 to share a common axis parallel to Z-axis direction. A workpiece W is supported between the spindle head 15 and the tail stock 16. A truing tool 17 is also mounted on the workpiece table 13, and an AE (acoustic emission) sensor 18 is attached to the support base 17a which supports the truing tool 17. The AE sensor 18 detects contact between the truing tool 17 and the grinding wheel 111.

The numerical controller 20 is mainly composed of a central processing unit (hereinafter referred to as "CPU") 201, a memory 202 in which a grinding wheel truing program and other data are stored, an X-axis pulse generation circuit 203, a Z-axis pulse generation circuit 204, and interfaces 205 and 206.

The servomotor 12 is connected to the X-axis pulse generation circuit 203 through a drive circuit 21, while the servomotor 14 is connected to the Z-axis pulse generation circuit 204 through a drive circuit 22. An input device 23 is connected to the interface 205 for inputting a grinding wheel truing program and other data into the memory 202, while the AE sensor 18 is connected to the interface 206.

In the memory 202, there is formed a diameter counter for detecting the absolute position in X-axis direction of the grinding wheel 111. The diameter counter is updated in response to the movement of the wheel head 11 so that the contents of the diameter counter indicates a diameter value Dab which is double the distance between the rotational axis Og of the grinding wheel 11 and the rotational axis Os of the workpiece spindle, as shown in FIG. 4.

The operation of the numerical controller 20 for carrying out a grinding wheel truing operation will be now described with reference to FIGS. 5 (a) through 9 (b).

When an operator gives a start command signal to the numerical controller 20 through the input device 23, the numerical controller 20 starts the execution of the truing program which is stored in a predetermined area of the memory 202, and shown in FIGS. 5 (a) and 5 (b).

In first step S1, it is ascertained whether or not the detection procedure in steps S2 through S6 has been carried out for all the surface portions 111a, 111b, 111c, and 111d of the grinding wheel 111. When it is ascertained that the procedure has been accomplished for all the surface portions, the processing moves from step S1 to step S7 for carrying out a grinding wheel truing cycle. On the other hand, when it is ascertained that the procedure has not been accomplished for all the surface portions yet, the processing moves from step S1 to step S2. In this case, the processing moves to step 2, because the procedure has not been accomplished for all the surface portions yet.

In step S2, one of table index positions corresponding to positions in Z-axis direction of the surface portions 111a–111d is read out by the CPU 201 from the memory 202. With this operation, a first index position IP1 corresponding to the cylindrical surface portion 111a is first read out from the memory 202. After the index position IP1 is read out, the CPU 201 causes the pulse generation circuit 204 to generate feed pulses whose number corresponds to a difference between of the present position of the workpiece table 13 and the index position IP1, whereby the servomotor 14 is driven by the drive circuit 22 so that the workpiece table 13 is moved to the first index position IP1. With this movement, the truing tool 17 is positioned to such a location that the truing tool 17 will engage the cylindrical grinding surface 111a when the wheel head 11 is advanced in X-axis direction.

In next step S3, the CPU 201 reads out a command value indicating the amount of advance movement of the grinding wheel 111 from the memory 202, and causes the pulse generation circuit 203 to generate pulses whose number corresponds to the read out command value. With this pulse generation, the servomotor 12 is driven by the drive circuit 21 whereby the grinding wheel 111 is advanced at a predetermined rapid feed rate. The amount of the rapid feed is so adjusted that the rapid feed is stopped before the cylindrical surface portion 111a contacts the truing tool 17. After the completion of the rapid feed, the feed rate of the wheel head 11 is lowered to a slow feed rate for advancing the wheel head 11 at a predetermined slow speed. This advance movement of the wheel head 11 at the low speed is continued until a contact signal is output from the AE sensor 18 (step S4). The AE sensor 18 outputs the contact signal in response to a sound wave which is generated when the cylindrical surface portion 111a of the grinding wheel 111 contacts the truing tool 17, as shown in FIG. 7 (a).

When the AE sensor 18 outputs the contact signal, the contact signal is transferred to the CPU 201 through the interface 206. In response to this contact signal, the processing moves from step S4 to step S5.

At step S5, an imaginal diameter D1 for the first cylindrical surface portion 111a is calculated and is stored in the memory 202. The imaginal diameter indicates the diameter of the top portion Gp of an imaginal grinding wheel having a desired final shape.

Namely, the imaginal diameter of an imaginal grinding wheel at its top portion Gp is calculated under the assumption that the first cylindrical surface portion of the imaginal grinding wheel coincides with the first surface portion 111a of the grinding wheel 111.

The imaginal diameter D1 of the imaginal grinding wheel is calculated by the following equation:

$$D1 = 2\{Dab/2 - (Ax + Bx1)/\sin\theta - Bx2.\tan(90° - \theta).\cos\theta\}$$

wherein Dab indicates the diameter representing the present position of the rotational axis Og of the grinding wheel 111 with respect to the rotational axis Os of the workpiece spindle, Ax indicates the distance between the tooling tool 17 and the rotational axis Os, Bx1 indicates the distance between the first and second cylindrical surface portions 111a and 111b, Bx2 indicates the radial width of the second end surface portion 111d and $\theta$ represents the angle between the rotational axis Os and X-axis direction, as shown in FIG. 8.

After this calculation, the process moves from step S5 to step S6 at which command pulses are generated to retract the wheel head 11 at a rapid feed rate to its retracted position. After that, the process moves back to step S1. The procedure in steps S2 to S6 is then repeated for other surface portions 111b, 111c, 111d and 111e.

During the above-mentioned operation, the truing tool 17 contacts the surface portions 111b, 111c and 111d, respectively, as shown in FIGS. 7 (b), 7 (c) and 7 (d), and the imaginal diameters D2, D3 and D4 for the surface portions 111b, 111c and 111d are calculated in a manner similar to that for the surface portion 111a.

In FIG. 6, arrows with solid lines indicate a moving locus of the truing tool 17 in the above operation, and the arrows S2, S3, S4 and S6 respectively correspond to the steps S2, S3, S4 and S6 of FIG. 5 (a).

Next, the operation for actually truing the grinding wheel 111 will be now described.

When it is ascertained at step S1 that the imaginal diameters for all the surfaces portions have been obtained, the process moves from step S1 to step S7 at which calculated imaginal diameters D1 through D4 are compared with each other to select the largest imaginal diameter and the smallest imaginal diameter from them. Assuming that the calculated imaginal diameters have a relationship D4>D1>D3>D2, the imaginal diameter D4 is selected as the largest one and D2 as the smallest one.

In next step S8, a predetermine value A is added to the largest imaginal diameter D4 to obtain a diameter which is used as an initial truing start position. After that the processing moves to step S9 at which a command for indexing the workpiece table 13 is read out and the pulse generation circuit 204 is operated to generate command pulses, whereby the workpiece table 13 is moved at a location where the truing tool 17 is located at a predetermined truing start position in Z-axis direction.

In step S10, a command for advancing the wheel head 11 at a rapid speed is read out from the memory 202, and the wheel head 11 is rapidly advanced in accordance with the read out command. With this operation, the truing tool 17 is located at the initial truing start position, as shown in FIG. 9 (a). In next step S11, the wheel head 11 and the workpiece table 13 are moved in accordance with the truing program so that the truing tool 17 is moved relative to the grinding wheel 111 along a predetermined locus corresponding to the desired final shape.

In next step S12, it is ascertained whether or not the radial position of the truing start position reaches or exceeds the truing operation end position which is obtained by subtracting a predetermined value B from the smallest imaginal diameter D2, as shown in FIG. 9 (b). When it is ascertained that the truing start position has not exceeded the truing operation end position yet, the process moves from step S12 to step S13 in which the radial position of the truing start position is shifted by a predetermined amount in a direction of approaching to the rotational axis of the grinding wheel 111. After that, the process moves to step S14 for retracting the wheel head 11 at a rapid feed rate, and the process moves back to step S9 to repeat the procedure of step S9-S11.

In FIG. 6, arrows with broken lines indicate a moving locus of the truing tool 17 in the above-described truing operation, and the allows S9, S10, S11 and S14 respectively correspond to the steps S9, S10, S11 and S14 of FIG. 5 (b).

By repeating the truing operation, all the surface portions 111a-111d of the grinding wheel 111 is gradually trued. During such truing operation, the truing tool 17 first engages the end surface portion 111d for truing it because the end surface portion 111d has the largest removal amount to be removed, while the truing tool 17 lastly engages the end surface portion 111b because the end surface portion 111b has the smallest removal amount to be removed.

When the all the surface portions 111a-111d have been trued and it is ascertained that radial position of the truing starting position has reached or has exceeded the truing operation end position, the process moves from step S12 to step S15 in which the wheel head 11 is retracted at a rapid feed rate to its retracted position. After that, the procedure for the truing operation ends.

As described above, the imaginal diameters D1-D4 are calculated for all the surface portions 111a-111d, and the largest imaginal diameter D4 and the smallest imaginal diameter D2 are selected from them. Since the imaginal diameters D1-D4 indicate respective removal amounts to be removed from the surface portions 111a-111d, it is judged that the end surface portion 111b has a largest removal amount and the end surface portion 111d has a smallest removal amount. The truing operation is started from the initial truing start position which is obtained by adding the predetermined value A to the largest imaginal diameter D4, and the truing operation is stopped when the position in X-axis direction of the truing start position reaches or exceeds the truing operation end position which is calculated by subtracting the predetermined value B from the imaginal diameter D2. Therefore, the initial truing start position and truing operation end position are optimally determined, whereby a time needed for carrying out the truing operation can be shortened. Further, since the value B is adjusted to be an optimum truing amount larger than a minimum truing amount required to properly carry out truing operation, all of the grinding surfaces are properly and surely trued, including the end surface portion 111d having the smallest removal amount.

In the above-mentioned embodiment, the present invention is used for truing a grinding wheel having a stepped peripheral shape. The present invention may be used for truing other types of grinding wheels, for example, a grinding wheel 30 having a long tapered portion, as shown in FIG. 10 (a), and a grinding wheel 40 having a crowning portion, as shown in FIG. 10 (b).

When the grinding wheel 30 shown in FIG. 10 (a) is trued, a relative movement is effected so that the truing tool contacts the long tapered grinding surface 30a at three different locations, and the contacts the cylindrical surface portion 30b, and the end surface portion 30c.

With this modification, the peripheral shape of the grinding wheel 30 can be accurately detected including the shape of the tapered portion 30b, whereby an optimum truing operation can be carried out regardless of the existence of the long tapered portion 30a.

When the grinding wheel 40 is shown in FIG. 10 (b) is trued, a relative movement is effected so that the truing tool contacts the crowning portion 40a at its both end portions and its center portion. By this operation, it becomes possible to accurately true the crowning portion.

The present invention may be used for truing other types of grinding wheels having peripheral shapes other than the above-mentioned shapes.

Further, present invention can be used in other types of grinding machines, such as a grinding machine in which the truing tool is movably mounted on the wheel head, and a grinding machine in which the wheel head is moved in a direction perpendicular to the moving direction of the workpiece table.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of truing a grinding wheel having a non-straight cylindrical grinding surface, comprising the steps of:

(a) effecting a relative movement between said grinding wheel and a truing tool so as to cause said truing tool to contact different portions of said grinding surface;

(b) detecting the relative position of said truing tool when said truing tool contacts the respective portions of said grinding surface;

(c) finding out a first portion from which a larger amount of abrasive layer must be removed compared to the rest of said grinding surface and a second portion from which a smaller amount of abrasive layer must be removed compared to the rest of said grinding surface, based on the detected positions;

(d) determining an initial radial location of a truing start position based on the radial location of said first portion and a radial location of a truing operation end position based on the radial location of said second portion;

(e) positioning said truing tool to said truing start position;

(f) traversing said truing tool from said truing start position along a locus corresponding to a desired final shape of said grinding wheel;

(g) shifting the radial location of said truing start position by a predetermined amount in a direction of approaching to the rotational axis of said grinding wheel;

(h) positioning said truing tool to the shifted truing start position; and (i) repeating said steps (f) and (h) until the radial location of said truing start position reaches or exceeds the truing operation end position.

2. A method of truing a grinding wheel according to claim 1, wherein said finding out step comprises the steps of:

carrying out calculation for each of said portions to obtain an imaginal diameter of a predetermined portion of an imaginal grinding wheel which has a desired final shape and which partially coincides with said grinding surface of the grinding wheel at each of said portions; and regarding a portion having a larger imaginal diameter compared to other portion or portions as said first portion, and regarding another portion having a smaller imaginal diameter compared to other portion or portions as said second portion.

3. An apparatus for truing a grinding wheel having a non-straight cylindrical grinding surface, comprising:
a truing tool;
means for effecting relative movement between said grinding wheel and said truing tool;
sensor means for detecting contact between said grinding wheel and said truing tool and for output a contact signal in response to contact between said grinding wheel and said truing tool;

means for effecting relative movement between said grinding wheel and said truing tool so as to cause said truing tool to contact different portions of said grinding surface;

means for detecting the relative position of said truing tool every time when said sensor means outputs the contact signal;

means for finding out a first portion from which a larger amount of abrasive layer must be removed compared to the rest of said grinding surface and a second portion from which a smaller amount of abrasive layer must be removed compared to the rest of said grinding surface, based on the detected positions;

means for determining an initial radial location of a truing start position based on the radial location of said first portion and a radial location of a truing operation end position based on the radial location of said second portion;

means for positioning said truing tool to said initial truing start position;

means for repeating the traverse movement of said truing tool along a locus corresponding to a desired final shape of said grinding wheel while the start position of the traverse movement is gradually shifted from the initial truing start position toward the rotational axis of said grinding wheel; and means for stopping the traverse movement when the start position of the traverse movement reaches or exceeds said truing operation end position.

4. An apparatus for truing a grinding wheel according to claim 3, wherein said means for finding out said first and second portion comprises:

means for carrying out calculation for each of said portions to obtain an imaginal diameter of a predetermined portion of an imaginal grinding wheel which has a desired final shape and which partially coincides with said grinding surface of the grinding wheel at each of said portions; and means for selecting a portion having a larger imaginal diameter compared to other portion or portions as said first portion, and selecting another portion having a smaller imaginal diameter compared to other portion or portions as said second portion.

5. An apparatus for truing a grinding wheel according to claim 4, wherein said sensor means comprises an acoustic emission sensor.

* * * * *